United States Patent
Gao et al.

(10) Patent No.: US 9,942,138 B2
(45) Date of Patent: Apr. 10, 2018

(54) METHOD AND DEVICE FOR POLICY BASED ROUTING

(71) Applicant: Huawei Technologies Co., LTD., Shenzhen (CN)

(72) Inventors: Zhenghai Gao, Shenzhen (CN); Jun Liu, Shenzhen (CN); Yongping Zhang, Shenzhen (CN); Jianzheng Zhang, Shenzhen (CN); Fengli Wang, Shenzhen (CN); Guojie Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 492 days.

(21) Appl. No.: 14/294,949

(22) Filed: Jun. 3, 2014

(65) Prior Publication Data

US 2014/0289424 A1    Sep. 25, 2014

Related U.S. Application Data

(63) Continuation of application No. PCT/CN2012/083348, filed on Oct. 23, 2012.

(30) Foreign Application Priority Data

Jan. 17, 2012 (CN) .......................... 2012 1 0013864

(51) Int. Cl.
*H04L 12/775* (2013.01)
*H04L 12/707* (2013.01)
(Continued)

(52) U.S. Cl.
CPC .............. *H04L 45/58* (2013.01); *H04L 45/24* (2013.01); *H04L 45/245* (2013.01); *H04L 45/28* (2013.01); *H04L 45/308* (2013.01); *Y02B 60/33* (2013.01)

(58) Field of Classification Search
CPC ....... H04L 45/58; H04L 45/24; H04L 45/245; H04L 45/308; H04L 45/28; H04L 45/22; Y02B 60/33
(Continued)

(56) References Cited

U.S. PATENT DOCUMENTS 6,751,191 B1 *  6/2004  Kanekar ............. H04L 12/4641
                                                  370/217
8,750,095 B2 *  6/2014  Bashandy ........... H04L 41/0663
                                                  370/218
(Continued)

FOREIGN PATENT DOCUMENTS

CN         101083625 A      12/2007
CN         101159669 A       4/2008
(Continued)

OTHER PUBLICATIONS

Hui Tang, "With IRF, smooth upgrade campus network" Text/ Huawei-3Com Technology Co., Ltd Education Networks, Oct. 10, 2005, 7 pages.

*Primary Examiner* — Kostas Katsikis
(74) *Attorney, Agent, or Firm* — Brinks Gilson & Lione (57) ABSTRACT

A method and a device for policy based routing are provided, which includes the device performing the steps of: setting interfaces of router(s) to be multiple redirection groups, wherein the redirection groups being ordered being according to a priority order; detecting interface states of interfaces in the redirection groups; and switching traffic among the multiple redirection groups according to the interface states of the interfaces in the redirection groups.

14 Claims, 5 Drawing Sheets

(51) Int. Cl.
*H04L 12/709* (2013.01)
*H04L 12/703* (2013.01)
*H04L 12/725* (2013.01)

(58) Field of Classification Search
USPC .................................................... 709/238
See application file for complete search history.

(56) References Cited

U.S. PATENT DOCUMENTS

| | | | | |
|---|---|---|---|---|
| 9,059,940 | B2* | 6/2015 | Jacob Da Silva | H04L 45/245 |
| 9,225,549 | B2* | 12/2015 | Christenson | H04L 12/4641 |
| 9,258,192 | B2* | 2/2016 | Thomas | H04L 41/12 |
| 9,344,359 | B1* | 5/2016 | Tiruveedhula | H04L 45/50 |
| 2002/0018447 | A1* | 2/2002 | Yamada | H04L 45/00 370/252 |
| 2002/0097730 | A1* | 7/2002 | Langille | H04L 12/4641 370/401 |
| 2003/0135644 | A1* | 7/2003 | Barrett | H04Q 3/66 709/238 |
| 2003/0212815 | A1* | 11/2003 | Tzeng | H04L 12/66 709/236 |
| 2004/0032856 | A1* | 2/2004 | Sandstrom | H04L 45/00 370/351 |
| 2004/0088430 | A1* | 5/2004 | Busi | H04L 45/16 709/238 |
| 2004/0141463 | A1 | 7/2004 | Acharya et al. | |
| 2004/0205215 | A1* | 10/2004 | Kouvelas | H04L 12/18 709/231 |
| 2004/0215819 | A1* | 10/2004 | Tsuruoka | H04L 45/10 709/238 |
| 2004/0218590 | A1* | 11/2004 | Clark | H04Q 3/0079 370/357 |
| 2005/0088965 | A1* | 4/2005 | Atlas | H04L 45/00 370/216 |
| 2005/0135231 | A1* | 6/2005 | Bellovin | H04L 45/02 370/216 |
| 2005/0169284 | A1* | 8/2005 | Natarajan | H04L 45/00 370/401 |
| 2006/0039385 | A1* | 2/2006 | Bare | H04L 12/18 370/400 |
| 2006/0184690 | A1* | 8/2006 | Milliken | H04L 63/1466 709/238 |
| 2006/0257143 | A1* | 11/2006 | Cavazzoni | H04J 14/0227 398/49 |
| 2006/0291378 | A1* | 12/2006 | Brotherston | H04L 12/2854 370/221 |
| 2007/0011350 | A1* | 1/2007 | Lu | H04L 12/185 709/238 |
| 2007/0041326 | A1* | 2/2007 | Babiarz | H04L 41/5022 370/237 |
| 2007/0253327 | A1 | 11/2007 | Saha et al. | |
| 2008/0112312 | A1* | 5/2008 | Hermsmeyer | H04L 45/00 370/228 |
| 2008/0181196 | A1 | 7/2008 | Regan et al. | |
| 2008/0225857 | A1* | 9/2008 | Lange | H04L 12/5695 370/395.5 |
| 2009/0067324 | A1* | 3/2009 | Licardie | H04L 12/40182 370/225 |
| 2009/0296579 | A1* | 12/2009 | Dharwadkar | H04L 12/4641 370/235 |
| 2010/0061231 | A1* | 3/2010 | Harmatos | H04L 12/5695 370/228 |
| 2010/0246396 | A1* | 9/2010 | Licardie | H04L 47/10 370/232 |
| 2010/0290469 | A1* | 11/2010 | Assarpour | H04L 45/00 370/392 |
| 2010/0290472 | A1* | 11/2010 | Raman | H04L 45/00 370/395.2 |
| 2010/0293200 | A1* | 11/2010 | Assarpour | H04L 45/00 707/802 |
| 2010/0329110 | A1 | 12/2010 | Rose et al. | |
| 2011/0271009 | A1* | 11/2011 | Doshi | H04L 45/00 709/242 |
| 2011/0286457 | A1* | 11/2011 | Ee | H04L 45/00 370/392 |
| 2012/0033668 | A1* | 2/2012 | Humphries | H04L 12/185 370/390 |
| 2012/0033672 | A1* | 2/2012 | Page | H04L 45/245 370/395.53 |
| 2012/0033678 | A1* | 2/2012 | Page | H04L 45/28 370/401 |
| 2012/0179800 | A1* | 7/2012 | Allan | H04L 45/245 709/223 |
| 2012/0182866 | A1* | 7/2012 | Vinayagam | H04L 45/245 370/228 |

FOREIGN PATENT DOCUMENTS

| | | |
|---|---|---|
| CN | 101674240 A | 3/2010 |
| CN | 101707570 A | 5/2010 |
| CN | 102035747 A | 4/2011 |
| CN | 102447639 A | 5/2012 |

* cited by examiner

METHOD AND DEVICE FOR POLICY BASED ROUTING

CROSS-REFERENCE TO RELATED APPLICATIONS

This application is a continuation of International Application No. PCT/CN2012/083348, filed on Oct. 23, 2012, which claims priority to Chinese Patent Application No. 201210013864.8, filed on Jan. 17, 2012, both of which are hereby incorporated by reference in their entireties.

TECHNICAL FIELD

The present disclosure relates to a communication technology field, and particularly, to a method and a device for policy based routing.

BACKGROUND

At present, with rapid development and extensive application of communication technologies, network size is increasingly enlarged, complexity and heterogeneity of a system are more prominent, and the amount of data information needing to be transmitted on a network is also significantly increased. For a router, functions of routing and forwarding need to be provided for a large number of messages.

A traditional routing method is to use a routing table for forwarding a message according to a destination address. However, if the traditional routing method is used, during a routing forwarding process, once a routing forwarding table is generated any change cannot be made arbitrarily. In this case, when traffic on the network is increased or a related outbound interface of the router is failed, load capacity and performance of the router may be limited by the routing forwarding table, and it is very difficult to change forwarding paths of traffic or forwarding paths of a part of traffic by means of routing at this moment, it is also difficult to realize load balance of various traffics at various interfaces.

Figure 1:
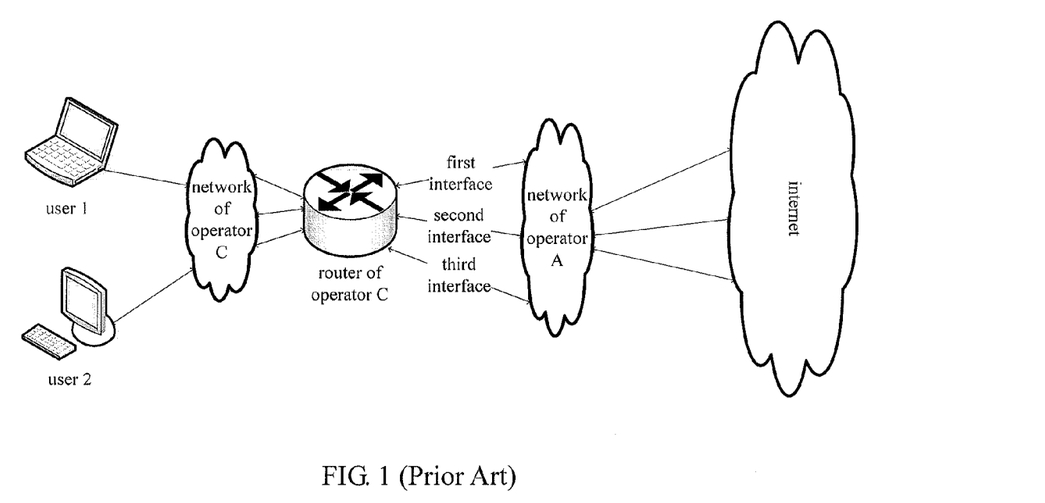
FIG. 1 is a schematic diagram of a network architecture using policy based routing in the prior art.
Figure 2:
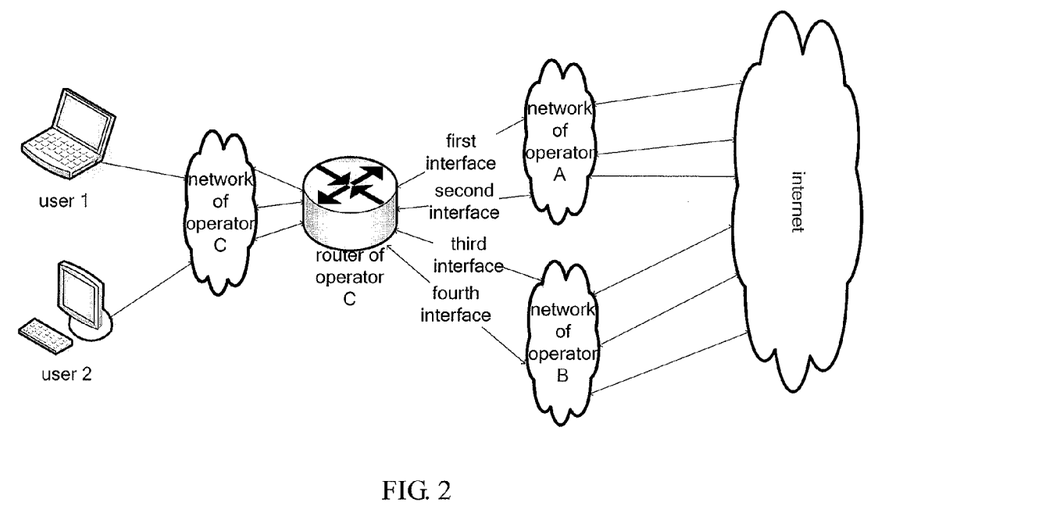
FIG. 2 is a schematic diagram of a network architecture including multiple operator networks.

In order to solve this problem, a policy based routing method with higher flexibility is mostly used in the prior art, which allows to forward data information according to a specified policy. For example, in a network architecture shown in FIG. 1, a user needs to access the internet through an operator C and an operator A. A router of the operator C is provided with three interfaces connected to a network of the operator A. Policy based routing is deployed by the operator C on the router of the operator C: input traffic is outputted by load sharing of the three interfaces connected to the network of the operator A; when an interface in the three interfaces is abnormal, traffic passing through the abnormal interface is shared to other normal interfaces; and when the abnormal interface is back to normal, load sharing is performed on the traffic again. However, this policy based routing method may only perform load sharing in one group of interfaces of a same router but may not perform load sharing and switching in multiple groups of interfaces of multiple routers shown in FIG. 2, and this policy based routing may only perform path switching and load sharing according to normality/abnormity of a physical state of a next-hop interface, but cannot perform path switching according to whether a whole path for arriving at a destination is reachable or not.

SUMMARY

Embodiments of the present disclosure provide a method and a device for policy based routing, which are capable of selecting any interface to perform load sharing, thereby enhancing reliability of data transmission.

On an aspect, a method for policy based routing includes: setting interfaces of router(s) to be multiple redirection groups, the redirection groups being ordered according to a priority order; detecting interface states of interfaces in the redirection groups; and switching traffic among the multiple redirection groups according to the interface states of the interfaces in the redirection groups.

On another aspect, a device for policy based routing, includes a setting unit, a detecting unit and a switching unit, wherein the setting unit is configured to set interfaces of router(s) to be multiple redirection groups, the redirection groups being ordered according to a priority order; the detecting unit is configured to detect interface states of interfaces in the redirection groups set by the setting unit, and inform a detected result to the switching unit; and the switching unit is configured to receive the detected result of the detecting unit, and switch traffic among the multiple redirection groups according to the interface states in the result.

It can be seen that, with the adoption of the method and the device of the embodiments of the present disclosure, deployment of multi-level policy based routing is completed by setting the interfaces of the router(s) to be multiple redirection groups with a priority relationship between each other, and completing switch of the traffic using the interface states of the interfaces in the redirection groups, so that optional optimizing the paths passing through other operators may be realized and operating costs are saved; and moreover, by configuring multi-level policy based routing, the reliability of data transmission is enhanced, and the networking of the operator is more flexible.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art will be given below. Apparently, the accompanying drawings in the description below are merely some of the embodiments of the present disclosure, based on which other drawings may be obtained by those of ordinary skill in the art without any inventive efforts.

DESCRIPTION OF EMBODIMENTS

A clear description of technical solutions of the embodiments of the present disclosure will be given below, in combination with the accompanying drawings in the embodiments of the present disclosure. Apparently, the embodiments described below are a part, but not all, of the embodiments of the present disclosure. All of other embodiments, obtained by those skilled in the art based on the embodiments of the present disclosure without any inventive efforts, fall into the protection scope of the present disclosure.

Figure 3:
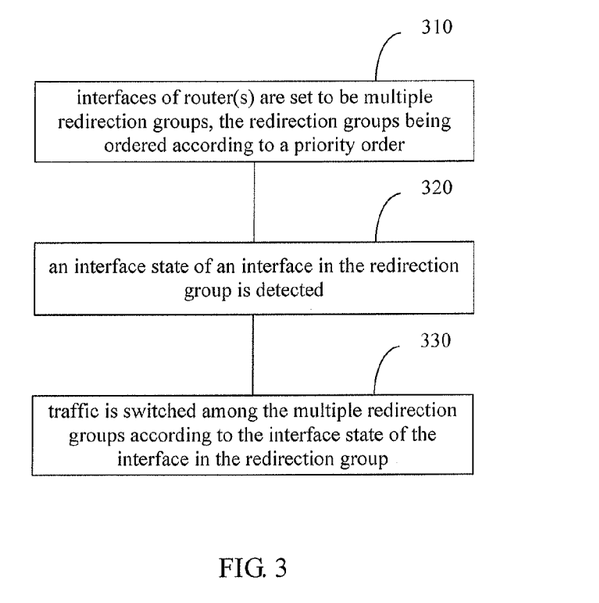
FIG. 3 is a schematic diagram of a method for policy based routing of embodiment 1 of the present disclosure.

Embodiment 1 of the present disclosure provides a method for policy based routing, as shown in FIG. 3, the method includes:

310: interfaces of router(s) are set to be multiple redirection groups, the redirection groups being ordered according to a priority order.

It should be noted that, in the embodiment, all interfaces of multiple routers in a network may be set to be multiple redirection groups, wherein each redirection group may include interfaces of different routers. Of course, all interfaces of each router in the network may also be set to be one redirection group, then multiple redirection groups may be set aiming at multiple routers, wherein each redirection group only includes all interfaces of one router. In addition, all interfaces of a single router may also be set to be multiple redirection groups, wherein each redirection group may include a part of interfaces of the router. Optionally, the redirection group may also not include a physical interface, and only at least one internet protocol (IP) address is set to be a redirection group, which is not described redundantly herein. However, it should be noted that, no matter how the multiple redirection groups are set, priorities among the multiple redirection groups are different, and the priorities of the redirection groups in the embodiment may be set and adjusted according to network conditions of operators or other conditions.

In addition, in the embodiment, if multiple interfaces are configured in each redirection group, the multiple interfaces in the redirection group may be configured to be in a priority relationship, or the multiple interfaces in the redirection group may be configured to be in a load sharing relationship, wherein the load sharing relationship is that: if states of a part of interfaces in the multiple interfaces are abnormal, traffic passing through abnormal state interfaces is shared to other normal state interfaces; and when the abnormal state interfaces are back to normal, load sharing is performed among all normal state interfaces on the traffic again.

320: an interface state of an interface in each redirection group is detected.

It should be noted that, the interface state in the embodiment is not merely a physical on-off state of an interface, and detection is performed based on a specified interface and a destination address, that is, a connectivity of a path from the specified interface to a destination is detected, if the path from the specified interface to the destination is reachable, the interface is determined to be normal, otherwise the interface is determined to be abnormal.

Detecting the interface state in the embodiment may be realized in a variety of ways, such as NQA (Network Quality Analyzer) detection, or BFD (Bidirectional Forwarding Detection), or DNS (Domain Name System) detection, or ICMP (Internet Control Message Protocol) detection or a ping command. No matter what way is used for detecting, detection contents in the embodiment include but not limited to a detection object, a detected outbound interface and detection time. For example, an NQA way is used for detecting, the detection object is IP address 198.41.0.4 of an American DNS root server, the detected outbound interface is Ethernet 1/0/0, and the detection time is 10 seconds, wherein a detection message is sent to the American DNS root server 198.41.0.4 through the Ethernet 1/0/0 in every 10 seconds, if the path is reachable, a reachable response message may be received in 10 seconds, in this way, the state of the Ethernet 1/0/0 of the interface may be judged to be normal.

In addition, in the embodiment, the interface state is stored after being detected, and re-detected when data traffic passes through the interface next time, if the interface state changes, policy based routing is executed according to the new interface state, that is, 330 is executed according to the new interface state.

It is noteworthy that, in the embodiment, an attribute of the detection process may also be set when the interface state is detected: if all paths from the specified interface to the destination are connected and reachable, the interface state is determined to be normal, otherwise the interface state is determined to be abnormal; or, if at least one path from the specified interface to the destination is reachable, the interface state is determined to be normal, if all the paths are not reachable, the interface state is determined to be abnormal. Of course, it is easily understood for those of ordinary skill in the art that the detection process may also be set to be other attributes, which the embodiment of the present disclosure does not make specific limit to, and which is not described redundantly herein.

330: traffic is switched among the multiple redirection groups according to the interface state of the interface in the redirection group.

When the interface states in a part of the redirection groups are all abnormal, other redirection group(s) are searched according to a priority order, traffic passing through an abnormal state interface is switched to a normal state interface in an other redirection group with a highest priority which has the normal state interface; and when the abnormal state interface is normal again, the traffic is switched back to the interface.

Specifically, when the states of the interface in the redirection group are all abnormal, a redirection group with the highest priority is selected, and all the normal state interfaces in the redirection group are searched, if all the interface states in the redirection group are abnormal, a redirection group with the second highest priority is sequentially selected, and all the normal state interfaces in the redirection group are searched, if the normal state interface is still not searched in the redirection group, a redirection group with the third highest priority is sequentially selected until the redirection group which has the normal state interface is searched; and the traffic passing through the abnormal state interface is switched to the normal state interface.

It is noteworthy that, if interfaces in the redirection group which has the normal state interface are set to be in a priority relationship, the traffic is switched to the normal state interface with a highest priority; and if the interfaces in the redirection group which has the normal state interface are set to be in a load sharing relationship, the traffic is switched to all the normal state interfaces.

In addition, it should be noted that, the step aforementioned only relates to a processing way with respect to that the interfaces in the redirection group are all abnormal, and for a processing way with respect to that a part of the interfaces in the redirection group are abnormal, an existing way may be adopted; for example, when a part of the interfaces in the redirection group are abnormal, the traffic passing through the interfaces is switched to other normal state interfaces; and when the part of the abnormal state interfaces are normal again, the traffic is switched back to the interfaces being normal again, which is not described redundantly herein.

The method of the aforementioned embodiment is illustrated in detail below by taking a specific network architecture shown in FIG. 4 as an example. If a user needs to access an internet, it needs to access the internet through networks of an operator C and an operator A, or networks of the operator C and an operator B; and in this case, the operator C considers based on some factors that it is needed to perform load sharing on traffic of the user preferably from a first interface and a second interface accessing to the operator A, and perform load sharing alternatively from a third interface and a fourth interface accessing to the operator B. Then, as shown in FIG. 5, a method for policy based routing includes:

S410: configuring the first interface and the second interface to be a redirection group A, and configuring the third interface and the fourth interface to be a redirection group B, wherein the priority of the redirection group A is higher than the priority of the redirection group B; and optionally, configuring the attribute of each interface in the redirection group A to be load sharing; and configuring the attribute of each interface in the redirection group B to be load sharing;

S420: detecting the interface states of the first interface and the second interface in the redirection group A as well as the third interface and the fourth interface in the redirection group B, wherein the detection may be performed using the NQA way: it is configured that the detection object of the NQA is the American DNS root server 198.41.0.4, the detected outbound interface is the first interface, and the detection time is 10 seconds; a detection message is sent to the American DNS root server 198.41.0.4 through the first interface in every 10 seconds, if the message is reachable, a reachable response message may be received in 10 seconds, in this way, the first interface may be judged to be normal, or else, the first interface may be judged to be abnormal;

S430: when both of the first interface and the second interface in the redirection group A are abnormal, searching whether the states of the third interface and the fourth interface in the redirection group B are normal, if yes, switching traffic passing through the first interface and the second interface to the third interface and the fourth interface; and when the first interface and/or the second interface are/is normal again, switching the traffic back to the interface(s) being normal again.

Figure 4:
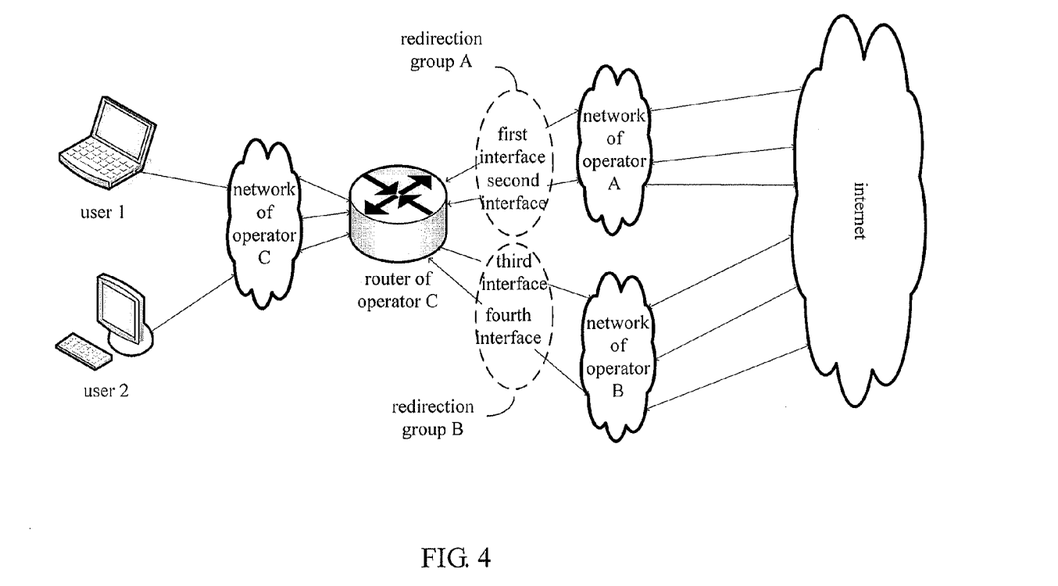
FIG. 4 is a schematic diagram of a network architecture using a method for policy based routing in an embodiment of the present disclosure.
Figure 5:
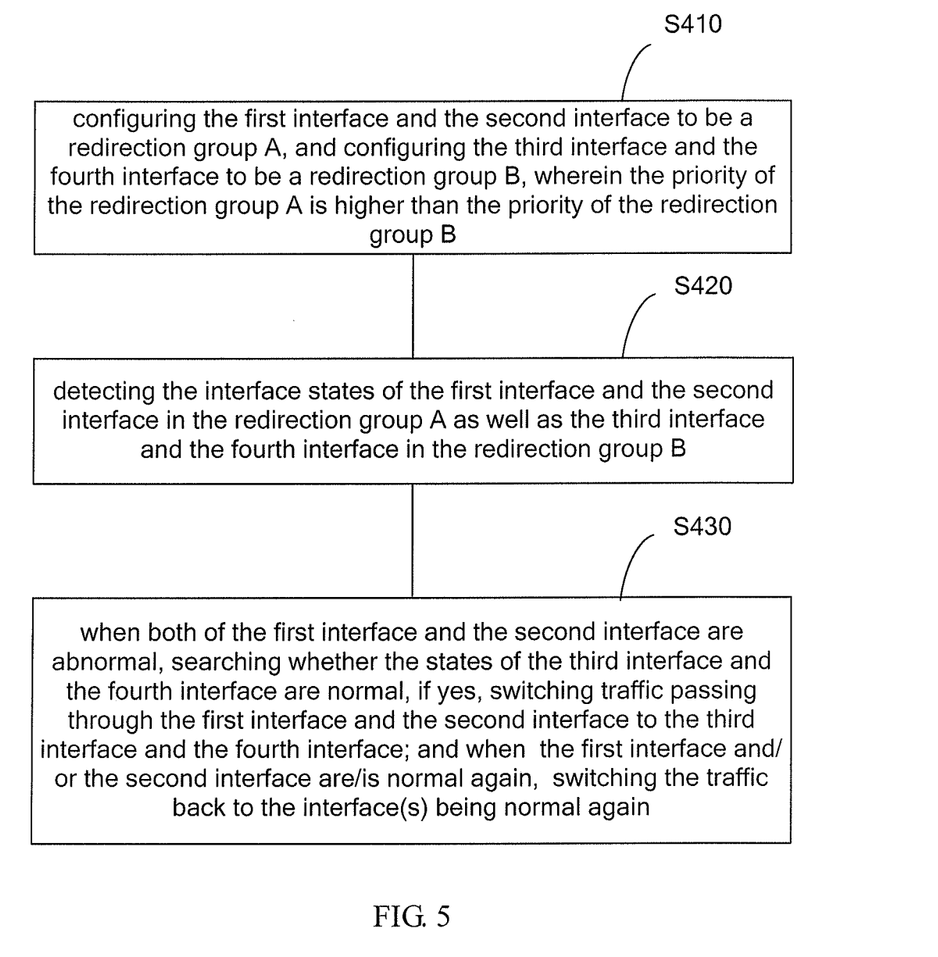
FIG. 5 is a schematic diagram of a method for applying policy based routing in the network architecture shown in FIG. 4.
Figure 6:
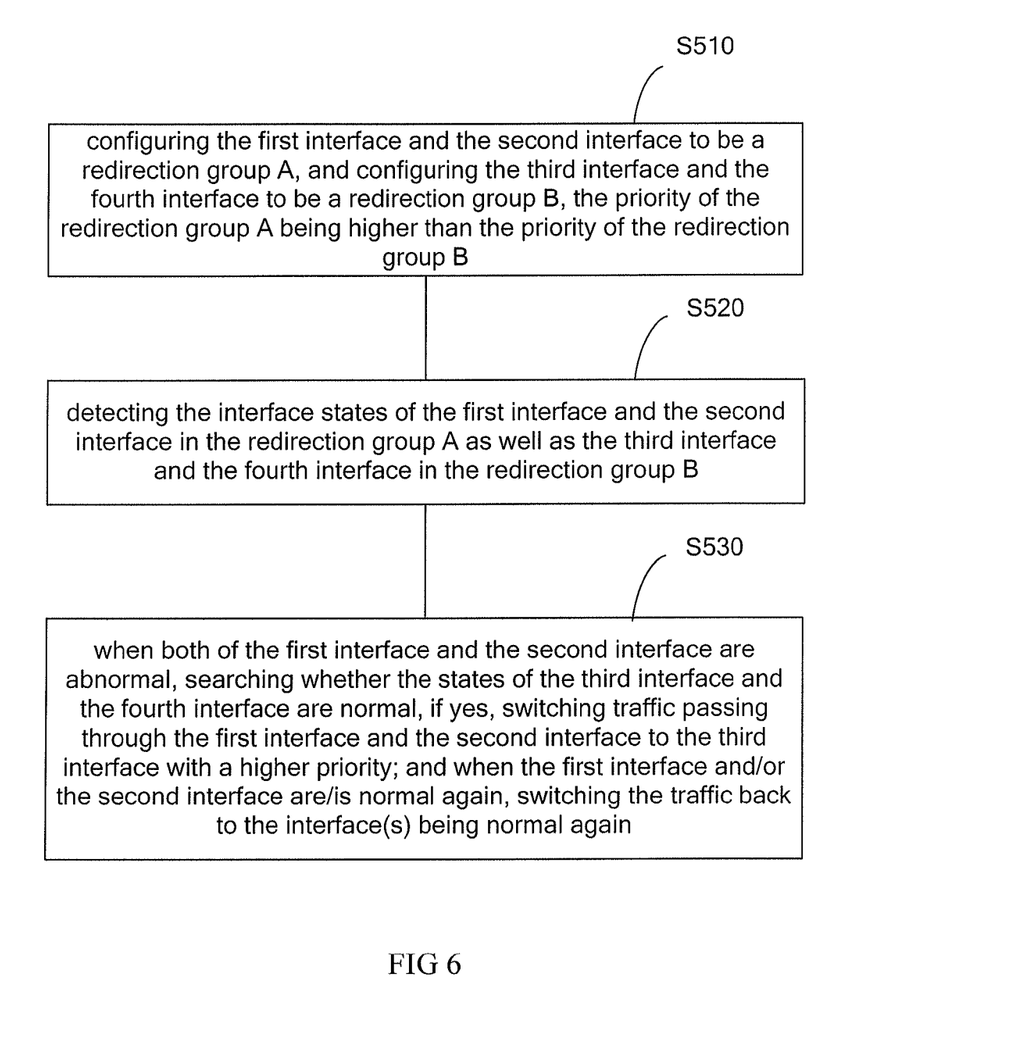
FIG. 6 is a schematic diagram of another method for applying policy based routing in the network architecture shown in FIG. 4.

In addition, as shown in FIG. 4, if the operator C considers based on some factors that it is needed to perform active/standby protection on the traffic of the user preferably from the first interface and the second interface accessing to the operator A, and perform active/standby protection alternatively from the third interface and the fourth interface accessing to the operator B; as shown in FIG. 6, a method for policy based routing includes:

S510: configuring the first interface and the second interface to be a redirection group A, and configuring the third interface and the fourth interface to be a redirection group B, the priority of the redirection group A being higher than the priority of the redirection group B, wherein the attribute of each interface in the redirection group A and the attribute of each interface in the redirection group B are respectively configured to be active/standby attribute, that is, the priority of the first interface is higher than the priority of the second interface, and the priority of the third interface is higher than the priority of the fourth interface;

S520: detecting the interface states of the first interface and the second interface in the redirection group A as well as the third interface and the fourth interface in the redirection group B, wherein the specific detection way is similar to ways in the prior art and in the aforementioned embodiments, which is not described redundantly; and S530: when both of the first interface and the second interface in the redirection group A are abnormal, searching whether the states of the third interface and the fourth interface in the redirection group B are normal, if yes, switching traffic passing through the first interface and the second interface to the third interface with a higher priority; and when the first interface and/or the second interface are/is normal again, switching the traffic back to the interface(s) being normal again.

It can be seen that, by virtue of the methods of the various embodiments aforementioned, deployment of multi-level policy based routing is completed by setting the interfaces of the router(s) to be multiple redirection groups with a priority relationship between each other, and completing switch of the traffic using the interface state of the interface in the redirection group, so that optional optimizing the paths passing through other operators may be realized and operating costs are saved; and moreover, by configuring multi-level policy based routing, the reliability of services is enhanced, and the networking of the operator is more flexible.

Figure 7:
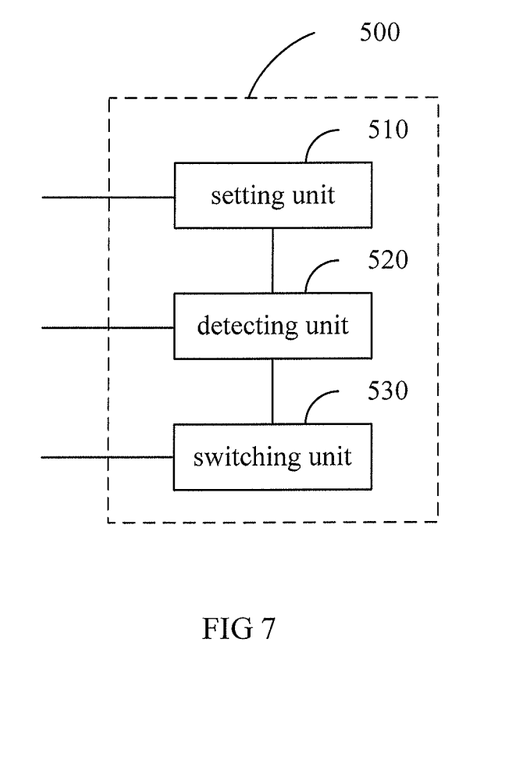
FIG. 7 is a structure schematic diagram of a device for policy based routing of embodiment 2 of the present disclosure.

Corresponding to the aforementioned method embodiment, embodiment 2 of the present disclosure further provides a device for policy based routing. As shown in FIG. 7, the device 500 for policy based routing includes a setting unit 510, a detecting unit 520 and a switching unit 530.

The setting unit 510 is configured to set interfaces of router(s) to be multiple redirection groups, the redirection groups being ordered according to a priority order, wherein the setting unit 510 may be further configured to configure multiple interfaces in the redirection group to be an attribute having a priority relationship or a load sharing relationship between each other.

The detecting unit 520 is configured to detect an interface state of an interface in each redirection group set by the setting unit 510, and inform a detected result to the switching unit 530. It should be noted that, the interface state detected by the detecting unit 520 at least includes a connectivity of a path from a specified interface to a destination;

The switching unit 530 is configured to receive the detected result of the detecting unit 520 and switch traffic among the multiple redirection groups according to the interface state in the result.

In addition, the detecting unit 520 may further include (not shown in the figure): a testing module and a first processing module.

The testing module is configured to test whether all paths from the specified interface to the destination are connected and reachable or not, and inform a tested result to the first processing module.

The first processing module is configured to receive the tested result of the testing module, when all paths are connected and reachable, determine the interface state to be normal, otherwise determine the interface state to be abnormal; or, when at least one path is reachable, determine the interface state to be normal, otherwise determine the interface state to be abnormal.

In addition, the switching unit 530 may further include (not shown in the figure):

a searching module, configured to search other redirection groups according to a priority order when interface states of the redirection group are all abnormal, and inform a searched result to a second processing module; and the second processing module, configured to receive the searched result of the searching module, and switch traffic passing through an abnormal state interface to a normal state interface in an other redirection group with a highest priority which has the normal state interface; and when the abnormal state interface is normal again, switch the traffic back to the interface.

Those of ordinary skill in the art may further realize that, units and algorithm steps in conjunction with the various examples described by the embodiments disclosed herein can be realized by electronic hardware, computer software or the combination thereof, and in order to clearly describe the interchangeability of hardware and software, the compositions and steps of the various embodiments are generally described according to functions in the description aforementioned. Whether the functions are executed by means of hardware or software depends on the specific applications and the design constraints of the technical solution. For those of skill in the art, the described functions may be realized on each specific application by using different methods, but the realization should not be considered as gonging beyond the scope of the embodiment of the present disclosure.

Steps in conjunction with the methods or algorithms described by the embodiments disclosed herein can be directly implemented by hardware, software modules executed by a processor, or the combination thereof.

With respect to the illustration aforementioned of the disclosed embodiments, those of skill in the art can realize or use the embodiments of the present disclosure. Obviously, various variations could be made to the present disclosure by any one of skill in the art, and general principles defined in the article could be realized in other embodiments without departing from the sprit and scope disclosed in the present disclosure. Therefore, the embodiments of the present disclosure cannot be limited to those described in the article, but the widest scope consistent with the principles and novel features disclosed herein.

The description above is only the preferred embodiments of the present disclosure, but not used for limiting the embodiments of the present disclosure. Any variations, equivalent replacements, improvements and the like made within the spirit and principles of the embodiments of the present disclosure should fall in the scope of the embodiments of the present disclosure.

What is claimed is:

1. A method for policy based routing, comprising:
   determining, by a device for policy based routing, each interface in a first redirection group is unreachable to a destination of traffic and multiple interfaces in a second redirection group are reachable to the destination, where each interface in the first redirection group has a first same next hop to the destination and each interface in the second redirection group has a second same next hop to the destination;
   switching, by the device, the traffic from the first redirection group to the second redirection group for transmitting the traffic on the multiple interfaces in the second redirection group reachable to the destination.

2. The method of claim 1, wherein the redirection groups comprise interfaces of different routers.

3. The method of claim 1, wherein multiple interfaces in the second redirection group are configured to have one of a priority relationship and a load sharing relationship between each other.

4. The method of claim 1, before determining, the method further comprising: setting, by the device, interfaces of at least one route into the first redirection group and the second redirection group.

5. The method of claim 4, where a first priority of the first redirection group is higher than a second priority of the second redirection group.

6. The method of claim 1, further comprising:
   storing the interface state after the interface state is determined, and re-detecting the interface state when data traffic passes through the interface next time, if the interface state is changed, executing policy based routing according to a new interface state.

7. The method of claim 1, further comprising:
   when an interface of the first redirection group is reachable to the destination again, switching, by the device, the traffic back to the interface of the first redirection group.

8. The method of claim 3, wherein if multiple interfaces in the second redirection group reachable to the destination are configured to be in a priority relationship, the traffic is switched to an interface reachable to the destination and with a highest priority; and if the multiple interfaces in the second redirection group are configured to be in a load sharing relationship, the traffic is switched to all the multiple interfaces reachable to the destination.

9. A device for policy based routing, comprising:
   a processor coupled to a memory having stored thereon executable program codes, wherein the program codes when executed by the processor, configure the device to:
   determine each interface in a first redirection group is unreachable to a destination of traffic and multiple interfaces in a second redirection group are reachable to the destination, where each interface in the first redirection group has a first same next hop to the destination and each interface in the second redirection group has a second same next hop to the destination, and
   switching, by the device, the traffic from the first redirection group to the second redirection group for transmitting the traffic on the multiple interfaces in the second redirection group reachable to the destination.

10. The device of claim 9, is further configured to:
    when an interface in the first redirection group is reachable to the destination again, switch the traffic back to the interface reachable to the destination and in the first redirection group.

11. The device of claim 9, wherein the multiple interfaces in the second redirection group have one of a priority relationship and a load sharing relationship between each other.

12. The device of claim 11, wherein the device is further configured to:
    if multiple interfaces in the second redirection group reachable to the destination are configured to be in a priority relationship, switch the traffic passing through an interface unreachable to the destination to an interface reachable to the destination and with a highest priority.

13. The device of claim 9, before determining, the method further comprising: setting, by the device, interfaces of at least one route into the first redirection group and the second redirection group.

14. The device of claim 13, where a first priority of the first redirection group is higher than a second priority of the second redirection group.

* * * * *